United States Patent [19]

Vosti et al.

[11] E Patent Number: Re. 31,762

[45] Reissued Date of Patent: Dec. 11, 1984

[54] CONTAINER

[75] Inventors: Donald C. Vosti, Crystal Lake, Ill.; Alan Silverman, Wilton, Conn.

[73] Assignee: American Can Company, Greenwich, Conn.

[21] Appl. No.: 206,386

[22] Filed: Nov. 13, 1980

Related U.S. Patent Documents

Reissue of:

[64] Patent No.: 4,125,632
Issued: Nov. 14, 1978
Appl. No.: 824,806
Filed: Aug. 15, 1977

U.S. Applications:

[63] Continuation-in-part of Ser. No. 743,960, Nov. 22, 1976, abandoned.

[51] Int. Cl.[3] ..... B65D 7/42; B65D 85/72

[52] U.S. Cl. ..... 426/111; 206/524.8; 215/1 C; 220/66; 220/70; 426/399

[58] Field of Search ..... 220/66, 67, 70, 1 BC; 215/1 C; 206/524.8; 426/111, 399, 400, 401, 402, 403, 404

[56] References Cited

U.S. PATENT DOCUMENTS

| | | | |
|---|---|---|---|
| 2,982,440 | 5/1961 | Harrison | 220/66 |
| 3,043,461 | 7/1962 | Glassco | 220/70 X |
| 3,054,679 | 9/1962 | Bradford | 220/66 X |
| 3,103,089 | 9/1963 | Allen | 220/66 X |
| 3,341,059 | 9/1967 | Schild et al. | 220/67 |
| 3,409,167 | 11/1968 | Blanchard | 220/66 |
| 3,410,939 | 11/1968 | Driza et al. | 220/67 X |
| 3,426,939 | 2/1969 | Young | 220/66 |
| 3,492,773 | 2/1970 | Bergstrom | 220/66 X |
| 3,524,568 | 8/1970 | Nughes | 220/67 |
| 3,900,120 | 8/1975 | Sincock | 215/1 C |

FOREIGN PATENT DOCUMENTS

| | | | |
|---|---|---|---|
| 698548 | 11/1964 | Canada | 220/66 |
| 1119542 | 6/1956 | France | 220/66 |
| 1299869 | 12/1972 | United Kingdom | 220/66 |

*Primary Examiner*—Allan N. Shoap
*Attorney, Agent, or Firm*—Paul R. Audet; Warren N. Low

[57] ABSTRACT

A plastic body is provided for use in a container which is adapted to hold product under vacuum, without undesirable deformation of the container. The body has a curvilinear bulge at the base of its cylindrical sidewall, and the bulge is dimensioned and configured to permit its slight deflection under vacuum which, in turn, facilitates upward movement of the bottom wall of the body. These changes effect a reduction of volume within the body, thereby reducing the level of vacuum which forms therewithin. The characteristics of the body render it particularly well-suited for production in relatively small sizes, utilizing relatively rigid synthetic resinous materials. It is also especially adapted for use in connection with a metal end closure, which may be hermetically sealed thereonto.

7 Claims, 6 Drawing Figures

CONTAINER

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of copending application Ser. No. 743,960 filed Nov. 22, 1976, now abandoned.

BACKGROUND OF THE INVENTION

Plastic containers having flexible bottom walls to accommodate the development of a vacuum therewithin are well-known and commercially available, a particularly desirable container being that which is disclosed in Blanchard U.S. Pat. No. 3,409,167. While such containers are entirely satisfactory under most circumstances, when they are made in small sizes and/or with relatively rigid resins, the functioning of the bottom wall may not be entirely adequate for certain applications. Thus, it is believed that, with the more rigid resins and the smaller end wall diameters, flexure of the bottom wall is inhibited somewhat, thereby limiting the degree of vacuum compensation which can be obtained. Thinning of the bottom wall in an effort to increase its flexibility may be disadvantageous in diminishing resistance to oxygen and water-vapor permeation therethrough, and also in increasing the tendency of the bottom wall to crease or pucker under vacuum.

The need to compensate for pressure differentials arises most dramatically in the case of containers which are filled with hot products, and thereafter promptly sealed. Upon cooling, thermal contractions, lowering of vapor pressure, and possible chemical reaction cause a partial vacuum to form, and this is particularly true when there is appreciable headspace above the product which, as a practical matter, will almost always be the case. This, in turn, may produce creasing and/or buckling of the container, if measures are not taken to reduce the vacuum level. These problems are, of course, particularly acute when a thermoplastic container is filled with a hot product, because of the diminished rigidity which the resin will typically exhibit at the elevated temperatures employed.

In addition to the foregoing, it is highly desirable to utilize, as a closure for such plastic container bodies, a metal end of the sort which is normally used with a metal can body. As is well known, such ends and bodies are generally joined by a double seaming technique, whereby flanges on the two members are interfolded so as to effect secure interengagement therebetween. The formation of such a double seam requires the application of a considerable compressive axial force, or top load, upon the closure. This, in turn, requires the body to possess a significant level of crush resistance, again with the difficulties attendant thereto being exacerbated when a heated thermoplastic body is involved. Finally, the application of such axial force will tend to deform a flexible bottom, thereby mechanically reducing the internal volume, causing a corresponding reduction in vacuum-compensating capacity.

It goes without saying that many of the foregoing difficulties can be avoided, or at least alleviated, by producing the plastic body with wall gauges which are sufficiently heavy to resist the forces involved. This, of course, is an unattractive alternative, not only because of the excessive cost for materials that would be involved, but also because of the disadvantages (in terms of shipping and the like) which the increased weight would engender.

Plastic containers of the present sort offer significant advantages in food packaging applications. Included in the variety of products which may be so packaged are gelled foodstuffs, such as fruit jellies. However, it has been found that, upon cooling of a jelly introduced into a rigid, unyielding, high-barrier, plastic-bodied container, a significant number of bubbles are formed and frozen within the product. One of the advantages of a plastic container is the aesthetic appeal which the use of a transparent resin can offer, and such appeal is seriously diminished by the presence of such bubbles. While it may be thought that the bubbles are formed by permeation of gas through the wall of the container under the influence of the internal vacuum which develops, this theory seems untenable in light of the respective gas permeabilities of the plastic material and the gelled product. More particularly, the permeability of the latter is much higher than that of the former, making it dubious that the vacuum force would be sufficient to draw the gas through the wall of the body, but not through the product, so that bubbles would be trapped within the latter. Accordingly one would not expect the relief of vacuum to dissipate any bubbles which are formed, or to inhibit their formation in the first instance.

Accordingly, it is a primary object of the present invention to provide a novel plastic body which is adapted for use in an hermetically sealed package, and which provides means for the relief of internal vacuum.

It is also an object of the invention to provide such a body, and a package utilizing the same, in relatively small sizes, using a relatively rigid synthetic resinous material having good oxygen and water vapor barrier properties, while minimizing the total amount of material utilized in fabrication, yet without sacrifice of such barrier properties.

Another object of the invention is to provide a body of the foregoing description which is well-suited for hot-filling, and for sealing with a closure that is double seamed thereonto.

Still another object of the invention is to provide a package employing a body of the foregoing type and containing a gelled product which is substantially free of trapped bubbles.

SUMMARY OF THE DISCLOSURE

It has now been found that certain of the foregoing and related objects of the invention are readily attained in a body for a container which is adapted, when closed, to hold a product under vacuum, comprising a sidewall and a bottom wall integrally formed as a single piece from a relatively rigid synthetic resinous material. The sidewall is generally cylindrical with an open upper end, and has means adjacent its upper end for hermetically securing a closure thereto. At the juncture with its bottom wall, the sidewall has a bulge of curvilinear cross-section, taken longitudinally through said sidewall (or along the longitudinal axis of the body). The bottom wall closes the lower end of the sidewall, and is of circular configuration, and an angular, downwardly directly circumferential edge is provided at the wall juncture and about the bottom wall. The material in the bulge is thinner than that in the remainder of the sidewall so that, upon hermetic sealing of the body and development of a substantial vacuum within the resultant container, at least a portion of the bulge may deform. The bulge deformation promotes upward movement of the bottom wall, thereby diminishing the volume of the container and hence the vacuum level therewithin.

In preferred embodiments, the diameter of the circumferential edge at the wall juncture of the bottom wall is less than the diameter of the sidewall above the bulge. The bottom wall desirably has formed therein, concentric with the circumferential edge, a downwardly projecting circular bed, which has a diameter which is at least equal to the radius of the circumferential edge.

Best results will generally occur when the material of the annulus between the bead and the circumferential edge is thinner than that of the bulge. The average thickness of the annulus should be between about 0.009R and 0.020R, wherein R represents the radius of the circumferential edge, and it is best determined at points lying a distance from the circumferential edge which is equal to about 1/16 of the diameter thereof. Generally, best function of the bottom wall will be afforded if the annulus is upwardly arched.

The securing means of the sidewall will normally be adapted for double seaming with a metal end closure and, to that end, it will preferably comprise a circumferential flange which forms a sharply apexed interior angle with the adjacent portion of the sidewall, with the angle having a value somewhat greater than 90°. Preferably, the angle of the flange will be about 102.5°. The body is especially well-suited to fabrication with synthetic barrier resins having high resistance to oxygen and water-vapor transmission, nitrile-based polymers being particularly useful and beneficial.

In especially preferred embodiments, the body is about 3½ inches high and the sidewall is about 2 inches in diameter, with the bulge extending about 0.025 inch therebeyond, and with the bottom wall bead having a diameter of 1¼ inches. The material of fabrication is desirably distributed in the following average thicknesses, in thousandths of an inch: in the sidewall adjacent the bulge, about 29 to 31, and preferably 30; in the bulge, about 17 to 26, and preferably 25; and in the annulus between the bead and the circumferential edge, about 15 to 28, and preferably about 22. In addition, the bulge average thickness preferably decreases gradually from a value of about 22 to 26, and most desirably about 25, at the juncture with the sidewall thereadjacent, to a value of about 19 to 25, and most desirably about 22, at a location about one-third the height of the bulge down from that juncture, to a value of about 17 to 21, and most desirably about 19, at a location about two-thirds of the way down, to a value of about 16 to 21 and most desirably about 19, at the circumferential edge.

Certain objects of the invention are attained in a package including a body, as hereinbefore described, together with a closure hermetically secured to the upper end of its sidewall, and a product contained therewithin. The package functions most notably when a partial vacuum exists therewithin, with the vacuum being of sufficient magnitude to deform at least a portion of the bulge, so as to move the bottom wall upwardly without causing substantial deformation of the sidewall. Typically, the partial vacuum will have a value of about 5 to 15 inches of memory. The package is particularly beneficial when the included product is in the form of a gel.

Certain other objects are attained in a package comprising a body fabricated from a relatively rigid, high oxygen and water-vapor barrier synthetic resinous material, a closure hermetically secured to, and closing, the body, and a substantially bubble-free, gelled product therewithin, under a partial vacuum and with headspace thereabove. The body has a sidewall portion and a base portion, with the base portion being more flexible than the sidewall portion and being adapted to preferentially deform under internal vacuum. In the package, at least part of the base portion is disposed inwardly from the position in which it would normally reside in the absence of the existing partial vacuum, and the sidewall portion is substantially undeformed. In a specific embodiment of this package, the body has a volume of about 180 cubic centimeters, the volumetric difference between the normal and inwardly disposed positions of the base portion of about 5 cubic centimeters, the headspace is about 5 cubic centimeters, and the partial vacuum has a value of about 10 inches of mercury. In most instances, the material used to fabricate the body will be a synthetic nitrile-based polymeric resin having high resistance to oxygen and water-vapor transmission.

DETAILED DESCRIPTION OF THE ILLUSTRATED EMBODIMENTS

Figure 2:
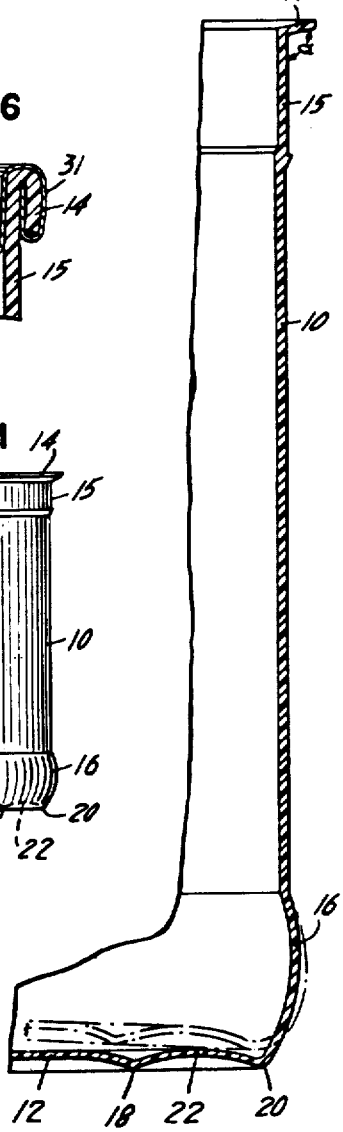
FIG. 2 is a fragmentary sectional view, through the longitudinal axis of the body of FIG. 1, drawn to a greatly enlarged scale and depicting right-hand portions of the sidewall and bottom wall thereof, and showing in phantom line a displaced position of the base of the body.
Figure 1:
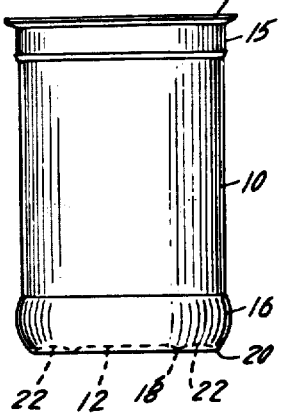
FIG. 1 is an elevational view of a container body embodying the present invention.
Figure 3:
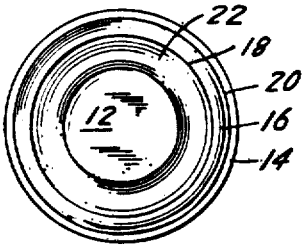
FIG. 3 is a bottom view of the body of FIG. 1.

Turning now in detail to FIGS. 1–3 of the appended drawing, therein illustrated is a plastic container body embodying the present invention, and consisting of a cylindrical sidewall 10 and a circular bottom wall 12. The sidewall 10 has at its open end a narrow, circumferential flange 14, which extends at a sharp interior angle "a" from the enlarged collar portion 15 thereof. In the illustrated embodiment, the angle "a" has a value of about 102.5°; the use of a sharp, unradiused angle at that juncture facilitates and improves the quality of the double seam, for which the flange 14 is ultimately to be employed, as will hereinafter be described in greater detail.

Adjacent the bottom of the body is a bulge portion 16, which has a curvilinear cross-section, taken along a longitudinal axis of the body, as can best be seen in FIG. 2. The material of the body is thinner, or of a lesser gauge, in the bulge portion 16 than in the remainder of the sidewall 10. As can also best be seen in FIG. 2, the end wall 12 is formed with a downwardly projecting circular bead 18, and the bottom wall 12 forms a downwardly disposed, angular circumferential edge 20 at the juncture with the bulge 16 of the sidewall 10. The bead 18 and the edge 20 are concentric, and define an arched annulus 22 therebetween, which is formed in a gauge which is further diminished from that of the bulge 16, the arch promoting maximum deflection under vacuum. It should be noted that the diameter of the bead 18 will generally be at least as great as the radius of the edge 20, since that will ensure that the bead 18 will reinforce the bottom 12 against radial creasing or wrinkling, without imparting an undue level of rigidity thereto, as intended.

It should also be noted that the diameter of the edge 20 is slightly smaller than that of the portion of the sidewall 10 above the bulge 16. This produces asymmetry in the bulge 16, and promotes the inward and upward movement of the lower portion thereof which, in turn, facilitates the overall deflection of the base portion of the body (i.e., the bulge 16 and the bottom wall 12) under partial vacuum. The reduced diameter of the edge 20 also improves stackability of the ultimate packages described, one upon another. The edge 20 itself provides a relatively fixed element about which the bottom wall may uniformly flex, thus stabilizing the container against rocking, tilting and the like.

Figure 5:
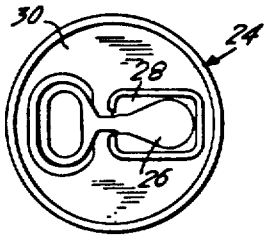
FIG. 5 is a plan view of the package of FIG. 4.
Figure 6:
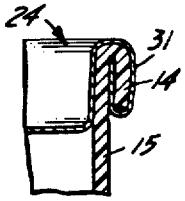
FIG. 6 is a fragmentary sectional view, through the longitudinal axis of the closed body of FIG. 4, showing an upper right-hand portion thereof, and illustrating the construction of the double seam by which the metal closure is attached to the body.
Figure 4:
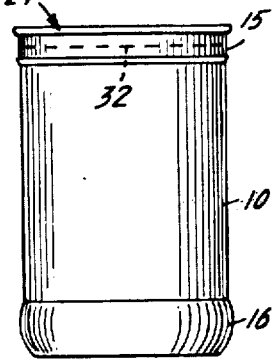
FIG. 4 is an elevational view of a package comprising the body of FIG. 1, with a metal end closure double seamed thereonto, and a product therewithin.

Turning now in detail to FIGS. 4–6, they illustrate the body of the [preceeding] *preceding* figures with a typical metal end closure, generally designated by the numeral 24, secured thereto, and with a product, having an upper surface 32, packaged therewithin. The closure 24 has a pull tab 26 defined in an insert 28, which is secured within the central panel 30 thereof; this type of end closure is now conventional, and need not be described in greater detail. As can best be seen in FIG. 6, the flange 31 of the closure 24 has been interfolded with the flange 14 of the body, in a double seam of the sort which is typical in all-metal containers. The sharp apex encourages hinging of the flange 14, while at the same time maximizing the length of that part thereof which cooperates in forming of the double seam, both features serving to enhance the security of the seal which is produced therebetween. While not essential, the slight upward attitude of the flange 14 serves a cushioning function, which helps to ensure uniform contact between the flange 14 and the closure 24 at the time that the double seam is formed, thus further ensuring the production of a secure, tight seal, and also promoting smoothness and dependability in the closing operations.

As shown in phantom line in FIG. 2, when the body is sealed (although FIG. 2 does not depict the end closure in place), and when a vacuum is drawn or developed (due, for example, to presence of headspace above a [colling] *cooling* product), the base portion of the body tends to deform so as to decrease the volume therewithin. This, in turn, tends to relieve the vacuum to a degree, thereby enhancing the ability of the container to withstand buckling due to external pressure, axial force, and/or normal abuse. More specifically, the bulge 16 tends to flex about its juncture with the adjacent cylindrical portion of the sidewall 10, with the protrusion of the central portion of the bulge becoming slightly more pronounced and with the lower portion thereof deflecting slightly inwardly and upwardly, in turn permitting [upwardment] *upward* movement of the bottom wall 12. This movement affords a significant volumetric reduction, without causing detrimental mechanical or aesthetic effects to occur.

As will be appreciated, and as has been discussed hereinbefore, upon creation of a vacuum within the sealed package, such as through cooling and consequent shrinkage of the product, the base portion of the body deforms inwardly, so as to partially relieve the vacuum. Through this mechanism, the level of pressure to which the sidewall of the body is subjected is correspondingly reduced which, in turn, means that it need exhibit less resistance to deformation than would be required if the full vacuum effect were imposed. Consequently, less resin is required to produce the body, with concomitant cost savings and weight reductions. As a specific example, utilizing the construction and dimensions described herein, it is feasible to produce a body having a 5½ ounce capacity, with as little as 12.8 grams of an ABS-type of resin, representing a significant reduction from the amount of the same resin which would be required if the body were not designed for vacuum relief.

As has also been alluded to, a typical volumetric change in a 5½ ounce (180 cubic centimeter) container made of an ABS resin and filled with a hot gel product (typically at 190° F.) is about 5 cubic centimeters, assuming an initial headspace, on filling, of 10 cubic centimeters. Under such circumstances, the final vacuum value is found to be about 10 inches of mercuty, whereas a vacuum of about 20 inches of mercury would develop were the body employed to have a non-compensating construction. With the body configuration specifically described, and made in the preferred and most desirable thicknesses hereinbefore set forth, volume reduction occurs both through bulge deformation, to promote upward movement of the bottom wall, and also through deflection, or doming, of the bottom wall, per se.

In addition to the dimensional details previously given, perhaps it should be mentioned that, in the most preferred embodiments, the thinnest section of the body will exist at the circumferential edge (i.e., at the sidewall/bottom wall juncture). A critical region of the body appears to exist at a location approximately 1/16 of a diameter inwardly from the circumferential edge, at which location the previously stated average thickness relationship of between 0.009–0.020 times the radius should be applied. Thus, in a nominal 2-inch diameter body, the critical region would be ⅛ inch inwardly from the edge.

It is important to note that the bottom wall of the body should not be flat, and that the arched annulus affords the most beneficial operation, especially when the central part of the bottom wall is also somewhat concave; i.e., deflection is promoted. While a body having single bead in its bottom wall has been illustrated, it may be advantageous to utilize two concentric beads instead. It is believed that more than two beads, however, will tend to impart undue rigidity to the bottom wall, and hence that in most instances a multiplicity of beads may be disadvantageous.

Use of a sidewall flange of the sort depicted is highly desirable from the standpoint of closure securement, it being most convenient and desirable to utilize a typical, double-seamed metal end closure for that purpose, and to employ conventional metal can closing equipment to effect interengagement. The intersection between the flange and the remainder of the sidewall should be as sharp as possible (i.e., unradiused) to encourage hinging thereabout, and consequent improved operation and results. It should be noted that it is quite surprising that the sharpness of the flange angle does not interfere with filling of the mold cavity utilized for its fabrication. The "tip-up" or interior angle between the flange and the adjacent sidewall portion should be somewhat greater than 90°; generally, it will not exceed about 115°, with an angle of about 102.5° appearing to be optimum. Concerning the thickness of the flange, if it is excessive the hook which occurs upon interfolding will be too short for maximum effectiveness. On the other hand, a flange which is too thin will cause some sacrifice of abuse resistance, and will tend to make molding at practical pressure levels unfeasible. A reasonable flange thickness appears to be about 20 thousandths. It should be appreciated that the plastic bodies herein described are most advantageously produced by injection blow molding technique, although other molding methods may be practicable.

The resin which is most appropiately utilized to fabricate the body of the present invention will depend upon many factors, including the specific dimensions and configurations involved, the nature of the product to be packged therewithin, the conditions under which packaging occurs, the way in which the package is to be handled subsequent to filling, etc. However, when the body is to be used as a container for a hot-filled food product which is subject to normal deterioration upon exposure, certain criteria must be satisfied.

More particularly, the resin must be sufficiently rigid to withstand the forces involved without being brittle, it must exhibit desirably low oxygen and water-vapor transmission properties, and it must not soften excessively at elevated temperatures. Desirable resins have been found to exhibit a tensile modulus (as determined by ASTM test D-638) in the range of about 300,000 to 600,000 psi at 73° F., and most desirably those values will be about 450,000 to 500,000 psi. The resin should exhibit a maximum oxygen transmission rate (as determined by a coulometric technique under study by an ASTM committee on "OX-TRAN" instrument at 73° F. and 0° relative humidity) of 5 cubic centimeters-mil/24 hours/100 square inches/atmosphere, with the most practical range being from about 1 to 3.5 cubic centimeters-mil. Concerning water-vapor transmissability, the value exhibited by the resin (as determined by ASTM E-96-66, Method E, at 100° F. and 90° relative humidity) should be less than about 10 grams-mil/24 hours/100 square inches, with the practical range being from about 4 to 8 grams-mil. Finally, the heat deflection temperature of the unannealed resin, under a load of 264 psi, should not be less than 10° F. above the maximum temperature to which the package will be subjected during filling and processing (which maximum temperature will usually be the temperature at which the product is introduced).

As specific examples of resins to be utilized to fabricate a body intended to contain jelly or fruit juice, filled at 190° F. and closed with a metal end by double-seaming, utilizing conventional can closing equipment, the ABS-type of resins have been found to be most satisfactory. In particular, CYCOPAC 920 and 930 (Borg-Warner products) and VICOBAR NR-16 (a DuPont product) have been found to function most effectively. It is believed that each of the foregoing resins is a graft copolymer of acrylonitrile and styrene monomers upon a butadine/styrene elastomeric substrate. In the case of the CYCOPAC products resins, it is believed that the substrate rubber includes the same monomers as are present in the graft phase, and that the 920 product includes methyl methacrylate.

Finally, it has been noted that the invention provides a package which is especially adapted for a gelled product, and which promotes freedom from trapped bubbles therewithin. Although the theory underlying this phenomenon is not understood, it is not believed that normal considerations of vacuum relief would have predicted the results observed. It is thought that the vacuum effect entails bubble nucleation and collapse mechanisms, rather than the drawing of gas through the body of the container.

Thus, it can be seen that the present invention provides a novel plastic body which is adapted for use in an hermetically sealed package, and which provides means for the relief of internal vacuum. The invention provides such a body, and a package utilizing the same, in relatively small sizes, utilizing a relatively rigid synthetic resinous material having good oxygen and water-vapor barrier properties; the amount of material utilized in fabrication is minimized, and yet barrier properties are not sacrificed. The invention also provides a body of the foregoing description which is well-suited for hot-filling, and also for sealing with a closure that is double-seamed thereonto. Finally, it provides a package employing a body of the foregoing type and containing a gelled product which is substantially free of trapped bubbles.

Having thus described the invention, what is claimed is:

[1. A body for a container which is adapted, when closed, to hold a product under vacuum, comprising a sidewall and a bottom wall integrally formed as a single piece from a relatively rigid synthetic resinous material, said sidewall being generally cylindrical with an open upper end, having means adjacent said upper end for hermetically securing a closure thereto and having, at the juncture with said bottom wall, a bulge of curvilinear cross-section, taken longitudinally through said sidewall, said bottom wall closing the lower end of said sidewall and being of circular configuration, said body having an angular, downwardly-directed circumferential edge at said juncture and extending about said bottom wall, said material in said bulge being thinner than that in the remainder of said sidewall and said material in the portion of said bottom wall adjacent said circumferential edge being thinner than said material of said bulge so that, upon hermetic sealing of said body and development of a substantial vacuum within the resultant container, at least a portion of said bulge may deform, to permit upward movement of said bottom wall to thereby diminish the volume of the container and hence the vacuum level therewithin.]

[2. The body of claim 1 wherein the diameter of said circumferential edge is less than the diameter of said sidewall directly above said bulge.]

[3. The body of claim 1 wherein said bottom wall has formed therein, concentric with said circumferential edge, a downwardly projecting, circular bead, said bead having a diameter which is at least equal to the radius of said circumferential edge.]

[4. The body of claim 3 wherein the material of the annulus between said bead and said circumferential edge is thinner than that of said bulge.]

[5. The body of claim 4 wherein the average thickness of said annulus is between about 0.009R and 0.020R wherein R represents the radius of said circumferential edge.]

[6. The body of claim 5 wherein said average thickness is determined at points lying at a distance from said circumferential edge which is equal to about 1/16 of the diameter of said edge.]

[7. The body of claim 4 wherein said annulus is upwardly arched.]

[8. The body of claim 1 wherein said securing means of said sidewall is adapted for double seaming with a metal end closure.]

[9. The body of claim 8 wherein said securing means comprises a circumferential flange, said flange forming a sharply apexed interior angle with the adjacent portion of said sidewall, said angle having a value somewhat greater than 90°.]

[10. The body of claim 9 wherein said angle of said flange is about 102.5°.]

[11. The body of claim 1 wherein said material is a synthetic barrier resin having high resistance to oxygen and water vapor transmission.]

[12. The body of claim 11 wherein said resin is an acrylonitrile-based polymer.]

[13. The body of claim 11, wherein said body is about 3½ inches high and said sidewall is about 2 inches in diameter with said bulge extending about 0.025 inch therebeyond, and wherein said bottom wall has formed therein, concentric with said circumferential edge, a downwardly projecting circular bead, said bead having a diameter of about 1¼ inches.]

[14. The body of claim 13, wherein said material is distributed in the following average thicknesses, in thousandths of an inch: in said sidewall adjacent said bulge, about 29 to 31, in said bulge, about 17 to 26; and in the annulus between said bead and said circumferential edge, about 15 to 28.]

[15. The body of claim 14 wherein said bulge average thickness, expressed in thousandths of an inch, decreases gradually from a value of about 22 to 26 at the juncture with said sidewall thereadjacent, to a value of about 19 to 25 at a location about one-third the height of said bulge down from said juncture, to a value of about 17 to 21 at a location about two-thirds of said height down from said juncture, to a value of about 16 to 21 at said circumferential edge.]

[16. A package including: a body comprising a sidewall and a bottom wall integrally formed as a single piece from a relatively rigid synthetic resinous material, said sidewall being generally cylindrical with an open upper end, having means adjacent said upper end for hermetically securing a closure thereto and having, at the juncture with said bottom wall, a bulge of curvilinear cross-section, taken longitudinally through said sidewall, said bottom wall closing the lower end of said sidewall and being of circular configuration, said body having an angular, downwardly-directed circumferential edge at said juncture and extending about said bottom wall, said material in said bulge being thinner than that in the remainder of said sidewall and said material in the portion of said bottom wall adjacent said circumferential edge being thinner than said material of said bulge so that upon hermetic sealing of said body and development of a substantial vacuum within the resultant container, at least a portion of said bulge may deform, to permit upward movement of said bottom wall, to thereby diminish the volume of the container and hence the vacuum level therewithin; a closure hermetically secured to said upper end of said sidewall and closing said body; and a product contained therewithin.]

[17. The package of claim 16 wherein a partial vacuum exists therewithin, said vacuum being of sufficient magnitude to deform at least said portion of said bulge so as to move said bottom wall upwardly without causing substantial deformation of said sidewall.]

[18. The package of claim 17 wherein said partial vacuum has a value of about 5 to 15 inches of mercury.]

[19. The package of claim 18, wherein said material is a synthetic nitrile-based polymeric resin, having high resistance to oxygen and water-vapor transmission.]

[20. The package of claim 18, wherein said product is in the form of a gel.]

*21. A body for a container adapted when closed to hold a product under vacuum without substantial deformation of the body and without unwanted ingress of oxygen into the body, comprising,*

*an elongated tubular sidewall merging at one end into a bottom wall closing said one end, and merging at the other end thereof into means for hermetically securing a closure thereto for closing said other end,*

*said sidewall and bottom wall being integrally formed from synthetic resinous material,*

*said sidewall and bottom wall having a high resistance to the permeability of oxygen,*

*said sidewall throughout a substantial and major portion of its axial length extending from said other end having substantial rigidity and resistance to inward deformation in response to internal vacuum,*

*said sidewall along the remaining portion of its axial length adjacent said one end, and, said bottom wall thereat together having sufficient flexibility for limited deformation in response to internal vacuum thereby to permit said bottom wall to deform axially inwardly of said tubular sidewall as the edge of said sidewall at said one end deflects radially inwardly, and the remaining sidewall portion between said edge and its juncture with said major sidewall portion, deforms to bulge slightly outwardly relative to said edge,*

*whereby said body can achieve a diminished container volume to lower the vacuum level therewithin.*

*22. The body of claim 21 wherein said sidewall remaining portion and said bottom wall are of reduced thickness as compared to the thickness of said sidewall major portion.*

*23. The body of claim 21 wherein said sidewall remaining portion is of generally radially outwardly extending curvilinear cross-section taken longitudinally therethrough.*

*24. The body of claim 23 wherein said bottom wall at said sidewall edge is of a diameter slightly less than that of said curvilinear sidewall remaining portion thereby to promote radially inward and axially upward movement of said edge to aid axial inward deformation of said bottom wall.*

*25. The body of claim 21 wherein said resistance to oxygen permeation of said synthetic resinous material is such that the permeation of oxygen is less than 5 cubic centimeters-mil/24 hours/100 square inches/atmosphere.*

*26. A package including a body in accordance with claim 21, a closure hermetically secured to said other end of said body, and a product therewithin.*

*27. The package of claim 26 having a partial vacuum existing therewithin following cooling of a hot-filled said product, said body having said bottom wall axially inwardly deformed, said sidewall edge radially inwardly deflected, and said remaining sidewall portion deformed to bulge slightly outwardly relative to said edge.*

* * * * *